United States Patent
Li et al.

(10) Patent No.: US 11,811,900 B2
(45) Date of Patent: Nov. 7, 2023

(54) PACKET PROCESSING METHOD AND FIRST NETWORK DEVICE

(71) Applicant: HUAWEI TECHNOLOGIES CO., LTD., Shenzhen (CN)

(72) Inventors: Liang Li, Bucharest (RO); Sheng Zhang, Bucharest (RO); Xingliang Diao, The Hague (NL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/665,819

(22) Filed: Feb. 7, 2022

(65) Prior Publication Data

US 2022/0159108 A1 May 19, 2022

Related U.S. Application Data

(63) Continuation of application No. PCT/CN2020/090729, filed on May 17, 2020.

(30) Foreign Application Priority Data

Aug. 15, 2019 (CN) .......................... 201910754969.0

(51) Int. Cl.
 *H04L 69/24* (2022.01)
 *H04L 45/24* (2022.01)
 *H04L 45/00* (2022.01)

(52) U.S. Cl.
 CPC ............ *H04L 69/24* (2013.01); *H04L 45/245* (2013.01); *H04L 45/66* (2013.01)

(58) Field of Classification Search
 CPC ....... H04L 69/24; H04L 45/245; H04L 45/66; H04L 45/28; H04L 61/00; H04L 2101/622; Y02D 30/50
 See application file for complete search history.

(56) References Cited

U.S. PATENT DOCUMENTS

| | | | |
|---|---|---|---|
| 2013/0227156 A1 | 8/2013 | Pirbhai et al. | |
| 2015/0172112 A1* | 6/2015 | Itkin | H04L 45/245 370/254 |

(Continued)

FOREIGN PATENT DOCUMENTS

| | | |
|---|---|---|
| CN | 101047711 A | 10/2007 |
| CN | 101656715 A | 2/2010 |

(Continued)

*Primary Examiner* — Steven Hieu D Nguyen
(74) *Attorney, Agent, or Firm* — Rimon PC

(57) ABSTRACT

Embodiments of this application disclose a packet processing method. The method in the embodiments of this application includes: receiving a first negotiation packet from a second network device based on a first interface of a first network device, where the first negotiation packet includes a first source media access control MAC address; determining whether the first source MAC address is the same as a first locked MAC address stored by the first network device, where the first locked MAC address is a MAC address of a network device that is determined by the first network device and that has established negotiation with the first network device; and when it is determined that the first source MAC address is different from the first locked MAC address stored by the first network device, skipping updating a link status of a first link based on the first negotiation packet.

20 Claims, 4 Drawing Sheets

(56) References Cited

U.S. PATENT DOCUMENTS

2016/0065407 A1 3/2016 Saltsidis
2019/0222584 A1* 7/2019 Zhao .................. H04L 63/1466

FOREIGN PATENT DOCUMENTS

| CN | 102946385 A | 2/2013 |
| CN | 103152260 A | 6/2013 |
| CN | 105704043 A | 6/2016 |
| CN | 108259442 A | 7/2018 |
| EP | 3474491 A1 | 4/2019 |
| WO | 2013148303 A1 | 10/2013 |

* cited by examiner

PACKET PROCESSING METHOD AND FIRST NETWORK DEVICE

CROSS-REFERENCE TO RELATED APPLICATIONS

This application is a continuation of International Application No. PCT/CN2020/090729, filed on May 17, 2020, which claims priority to Chinese Patent Application No. 201910754969.0, filed on Aug. 15, 2019. The disclosures of the aforementioned applications are hereby incorporated by reference in their entireties.

TECHNICAL FIELD

This application relates to the packet processing field, and in particular, to a packet processing method and a first network device.

BACKGROUND

A link aggregation technology, also referred to as a trunk technology, is a bundling technology. As shown in FIG. 1, in a link aggregation technology, a plurality of physical links are bundled into one logical link. The logical link is an aggregated link, and is also referred to as a trunk link or a link aggregation group (LAG). Each of the physical links that are bundled together is referred to as a member link. The link aggregation technology can increase bandwidth, improve reliability, and implement load sharing. A plurality of interfaces can be bundled together by using the link aggregation technology, to increase interface bandwidth at relatively low cost. For example, when three 100 Mbit/s full-duplex links are bundled together, a maximum bandwidth of 300 Mbit/s can be reached.

Currently, after the appearance of a link aggregation control protocol (LACP) technology, the LACP as a basic protocol provides a standard negotiation manner for devices that exchange data with each other. Devices on both sides of a link automatically establish an aggregated link based on the LACP through exchange of LACP negotiation packets, that is, through LACP negotiation, and use the aggregated link to receive and send data. After the aggregated link is formed, when a link status of a member link changes, the devices on both sides of the link may further maintain a status of the aggregated link through exchange of LACP negotiation packets, to automatically adjust or unbundle the aggregated link.

However, in the process of or after the establishment of an aggregated link through negotiation based on the LACP protocol, a "transparent transmission" phenomenon usually occurs. This affects a normal process of establishing the aggregated link in an LACP mode or affects a status of the established aggregated link. Specifically, FIG. 2 is a schematic diagram of a "transparent transmission" scenario. It is assumed that an aggregated link based on an LACP mode has been established between a device A and a device B or an aggregated link is being established between the device A and the device B through LACP negotiation. In this case, a device C sends an LACP negotiation packet for a reason such as an incorrect configuration of the device C or an attack caused by the device C. This negotiation packet is transparently transmitted to the device A over an L2 network. After receiving the negotiation packet, the device A updates an interface status of the device A based on the negotiation packet. As a result, a status of a member interface on the device A side flaps. Further, the establishment of the aggregated link to be established between the device A and the device B may fail, or data transmission over the already established aggregated link may be affected.

SUMMARY

Embodiments of this application provide a packet processing method, to reduce a probability of a link establishment failure or improve stability of data transmission over an already established link.

In view of this, a first aspect of the embodiments of this application provides a packet processing method. The method may include the following steps:

When running, a first network device, namely, a device such as a switch or a router, receives, through a first interface on the first network device side, a first negotiation packet sent by a second network device. The first negotiation packet includes a first source media access control MAC address, and the first source MAC address is a MAC address of the second network device. The first negotiation packet is used to update a link status of a first link, and the first link is a link over which the first network device communicates with the second network device based on the first interface.

Before updating the link status of the first link based on the first negotiation packet, the first network device further needs to determine whether the first source MAC address is the same as a first locked MAC address stored by the first network device. The first locked MAC address is a MAC address of a network device that is determined by the first network device and that has established negotiation with the first network device. Whether the first source MAC address is the same as the first locked MAC address is determined, to determine whether the second network device is a network device that is determined by the first network device and that has established negotiation with the first network device. The established negotiation means that the first link is being established or the first link has been established.

Then, when the first network device determines that the first source MAC address is different from the first locked MAC address stored by the first network device, that is, determines that the second network device is not a network device that has established negotiation with the first network device, the first network device skips updating the link status of the first link based on the first negotiation packet.

Based on the foregoing description, it can be learned that, in this embodiment of this application, whether the first source MAC address carried in the first negotiation packet is the same as the first locked MAC address stored by the first network device is determined, to determine whether the second network device is a network device that has established negotiation with the first network device. If the first source MAC address carried in the first negotiation packet is different from the first locked MAC address stored by the first network device, that is, the second network device is not a network device that has established negotiation with the first network device, the first network device skips updating the link status of the first link based on the first negotiation packet. This avoids a case in which establishment of an aggregated link fails, data transmission over an aggregated link is affected, or the like because the first network device updates a link status based on a negotiation packet sent by an incorrect peer device.

In a specific implementation, before the first network device receives the first negotiation packet, the method may further include: The first network device receives a second negotiation packet from a third network device based on the first interface. If the first network device determines, in this case, that no locked MAC address is locally stored, the first network device stores a second source MAC address as the first locked MAC address, and updates a link status of a second link based on the second negotiation packet. The second negotiation packet may include the second source MAC address, the second source MAC address indicates the third network device, the second negotiation packet is used to update the link status of the second link, and the second link is a link over which the first network device communicates with the third network device based on the first interface. It should be noted that, herein, the operation of updating, by the first network device, a link status of a second link based on the second negotiation packet should be understood as that the first network device establishes negotiation with the third network device based on the second negotiation packet. In this embodiment of this application, after the first network device receives the second negotiation packet sent by the third network device, if the first network device determines that the first network device does not locally store the first locked MAC address, the first network device uses the second source MAC address carried in the second negotiation packet as the first locked MAC address, that is, enables the second source MAC address to enter a locked state. In this way, a device other than the third network device is prevented from interfering with a process of establishing negotiation between the first network device and the third network device.

In a specific implementation, after the first network device stores the second source MAC address as the first locked MAC address, the method may further include: After the first network device receives the second negotiation packet sent by the third network device and establishes negotiation with the third network device based on the second negotiation packet, the first network device starts a timer from a time point at which the first network device receives the second negotiation packet. If the first network device determines that the first network device does not receive a third negotiation packet from the third network device based on the first interface within a preset first period, the first network device clears the first locked MAC address, where a source MAC address in the third negotiation packet is the second source MAC address. In this embodiment of this application, the process of establishing negotiation between the first network device and the third network device is controlled by setting the first period, to avoid a case in which the first network device fails to negotiate successfully after a long time, wasting negotiation time.

In a specific implementation, after the first network device stores the second source MAC address as the first locked MAC address, the method may further include: After the first network device receives the second negotiation packet and the third negotiation packet and performs a corresponding operation, if the first network device determines, starting from the time point at which the first network device receives the second negotiation packet, that the first network device receives a fourth negotiation packet from the third network device based on the first interface within a preset second period, and the first network device determines, when the second period elapses, that the link status of the second link is a DOWN state, the first network device clears the first locked MAC address. The DOWN state indicates that the second link is not successfully established or the second link is successfully established but data cannot be transmitted over the second link due to a fault. A source MAC address in the fourth negotiation packet is the second source MAC address, and the length of the second period is greater than that of the first period. In this embodiment of this application, duration for establishing negotiation between the first network device and the third network device is controlled by setting the second period, to avoid a waste of time caused by failing to negotiate successfully after a long time.

In a specific implementation, after the first network device stores the second source MAC address as the first locked MAC address, the method may further include: The first network device determines that the first network device receives a fifth negotiation packet from the third network device based on the first interface within a preset first period. A source MAC address in the fifth negotiation packet is the second source MAC address. The first network device determines, based on the second negotiation packet and the fifth negotiation packet, that the link status of the second link is an UP state. In this embodiment of this application, after establishing negotiation with the third network device based on the second negotiation packet and the fifth negotiation packet that are successively sent by the third network device, the first network device determines that the link status of the second link is the UP state. The UP state indicates that the second link is successfully established and data can be transmitted over the second link.

In a specific implementation, after the first network device determines, based on the second negotiation packet and the fifth negotiation packet, that the link status of the second link is the UP state, the method may further include: When the first network device determines that the link status of the second link changes from the UP state to the DOWN state, the first network device restarts a timer after the first period; and if the link status of the second link does not change from the DOWN state back to the UP state within a preset third period, when the third period elapses, the first network device clears the recorded first locked MAC address, and disconnects the second link; or if the link status of the second link changes from the DOWN state back to the UP state within a preset third period, the first network device ends the timer operation. In this embodiment of this application, the third period is set, and if the link status of the second link changes from DOWN back to UP within the third period, the timer operation is ended; otherwise, when the third period elapses, the recorded first locked MAC address is cleared, and the second link is disconnected, so that the first network device can restart to establish negotiation with another network device. In this way, impact on data transmission caused by the second link being in the DOWN state for a long time is avoided.

In a specific implementation, the first negotiation packet is a link aggregation control protocol LACP negotiation packet, the first link is an aggregated link, and the aggregated link may include at least one physical link.

In a specific implementation, the second negotiation packet is an LACP negotiation packet, the second link is an aggregated link, and the aggregated link may include at least one physical link.

A second aspect of the embodiments of this application provides a first network device for packet processing. The first network device may include:

a receiver, configured to receive a first negotiation packet from a second network device based on a first interface of the first network device, where the first negotiation packet may include a first source media access control MAC address, the first source MAC address indicates the second network device, the first negotiation packet is used to update a link status of the first link, and the first link is a link over which the first network device communicates with the second network device based on the first interface; and a processor, configured to: determine whether the first source MAC address is the same as a first locked MAC address stored by the first network device, where the first locked MAC address is a MAC address of a network device that is determined by the first network device and that has established negotiation with the first network device; and when the first network device determines that the first source MAC address is different from the first locked MAC address stored by the first network device, skip updating the link status of the first link based on the first negotiation packet.

In a specific implementation, the receiver is further configured to receive a second negotiation packet from a third network device based on the first interface, where the second negotiation packet may include a second source MAC address, the second source MAC address indicates the third network device, the second negotiation packet is used to update a link status of a second link, and the second link is a link over which the first network device communicates with the third network device based on the first interface; and the processor is further configured to: when it is determined that the first network device does not store a locked MAC address, store the second source MAC address as the first locked MAC address, and update the link status of the second link based on the second negotiation packet.

In a specific implementation, the processor is further configured to: when it is determined that a third negotiation packet from the third network device is not received based on the first interface within a preset first period, clear the first locked MAC address, where a source MAC address in the third negotiation packet is the second source MAC address.

In a specific implementation, the processor is further configured to: when the first network device determines that the first network device receives a fourth negotiation packet from the third network device based on the first interface within a preset second period, and the first network device determines, when the second period elapses, that the link status of the second link is a DOWN state, clear the first locked MAC address, where a source MAC address in the fourth negotiation packet is the second source MAC address, and the length of the second period is greater than that of the first period.

In a specific implementation, the receiver is further configured to receive a fifth negotiation packet from the third network device based on the first interface within a preset first period, where a source MAC address in the fifth negotiation packet is the second source MAC address; and the processor is further configured to determine, based on the second negotiation packet and the fifth negotiation packet, that the link status of the second link is an UP state.

In a specific implementation, the processor is further configured to: start a timer when it is determined that the link status of the second link changes from the UP state to the DOWN state; and if the link status of the second link does not change from the DOWN state back to the UP state within a preset third period, when the third period elapses, clear the recorded first locked MAC address, and disconnect the second link; or if the link status of the second link changes from the DOWN state back to the UP state within a preset third period, end the timer operation.

In a specific implementation, the first negotiation packet is a link aggregation control protocol LACP negotiation packet, the first link is an aggregated link, and the aggregated link may include at least one physical link.

In a specific implementation, the second negotiation packet is an LACP negotiation packet, the second link is an aggregated link, and the aggregated link may include at least one physical link.

A third aspect of the embodiments of this application provides a first network device for packet processing, where the first network device may include:

a processor, a memory, and a transceiver, where the transceiver is configured to communicate with an apparatus other than the first network device;

the memory is configured to store instruction code; and when executing the instruction code, the processor enables the first network device to perform the method according to any one of the first aspect or the implementations of the first aspect.

A fourth aspect of the embodiments of this application provides a computer storage medium. The medium stores instructions, and when the instructions are run on a computer, the computer is enabled to perform the method according to any one of the first aspect or the implementations of the first aspect.

A fifth aspect of the embodiments of this application provides a computer program product. The computer program product may include instructions, and when the instructions are run on a computer, the computer is enabled to perform the method according to any one of the first aspect or the implementations of the first aspect.

A sixth aspect of the embodiments of this application provides a chip system. The chip system includes a processor, configured to support a first network device in implementing a function implemented in any one of the first aspect or the implementations of the first aspect, for example, sending or processing data and/or information used in the foregoing method. In a possible design, the chip system further includes a memory, and the memory is configured to store program instructions and data that are necessary for the first network device. The chip system may include a chip, or may include a chip and another discrete device.

It can be learned from the foregoing technical solutions that the embodiments of this application have the following advantages:

After receiving, based on the first interface, the first negotiation packet sent by the second network device, the first network device determines whether the first source MAC address included in the first negotiation packet is the same as the first locked MAC address stored by the first network device; and if the first source MAC address included in the first negotiation packet is different from the first locked MAC address stored by the first network device, the first network device skips updating the link status of the first link based on the first negotiation packet. The first negotiation packet is used to indicate to update the link status of the first link, the first link is a link over which the first network device communicates with the second network device based on the first interface, and the first locked MAC address is a MAC address of a network device that is determined by the first network device and that has established negotiation with the first network device. It can be learned from the foregoing description that, whether the first source MAC address is the same as the first locked MAC address is determined, to determine whether the second network device is a network device that has established negotiation with the first network device. If the first source MAC address is different from the first locked MAC address, that is, the second network device is not a network device that has established negotiation with the first network device, the first network device skips updating the link status of the first link based on the first negotiation packet. This avoids a case in which establishment of an aggregated link fails, data transmission over an aggregated link is affected, or the like because the first network device updates a link status based on a negotiation packet sent by an incorrect peer device.

DESCRIPTION OF EMBODIMENTS

The following describes some terms in this application.

A link aggregation technology, in essence, is "combining" a number of physical links between two devices into one logical link to satisfy a requirement for a high-bandwidth link between the two devices. The logical link is an aggregated link. When a sending device needs to perform data forwarding over the aggregated link, the sending device selects one or more physical member interfaces in an active state from physical member interfaces of an aggregated link interface, that is, selects one or more physical member links, to perform data forwarding.

Specifically, an aggregated link in the embodiments of this application may be a LAG or a trunk link. For example, the aggregated link may be a multi-chassis link aggregation group (M-LAG), a multi-chassis link aggregation group (MC-LAG), an enhanced trunk e-trunk link, or an Ethernet trunk eth-trunk link. The e-trunk generally refers to link aggregation between devices, and the eth-trunk generally refers to link aggregation for one device. A form of an aggregated link is not specifically limited in the embodiments of this application.

Currently, an aggregated link may be established in a manual mode. After the appearance of an LACP technology, a mode of automatically establishing an aggregated link based on the LACP protocol, that is, an LACP mode, is further provided. In the manual mode, in the process of and after the establishment of the aggregated link (including creating an aggregated link interface and setting a member interface), updating of a status of the aggregated link (including changing a member link, controlling connection and disconnection of the aggregated link, and the like) needs to be manually performed. In the LACP mode, in the process of and after the establishment of the aggregated link (including creating aggregated link interfaces, setting member interfaces, and setting an active interface and a backup interface in the member interfaces), updating of a status of the aggregated link (including changing a member interface, changing the active interface and the backup interface in the member interfaces, controlling connection and disconnection of the aggregated link, and the like) can be automatically performed by devices on both sides of the aggregated link through exchange of LACP negotiation packets.

Figure 3:
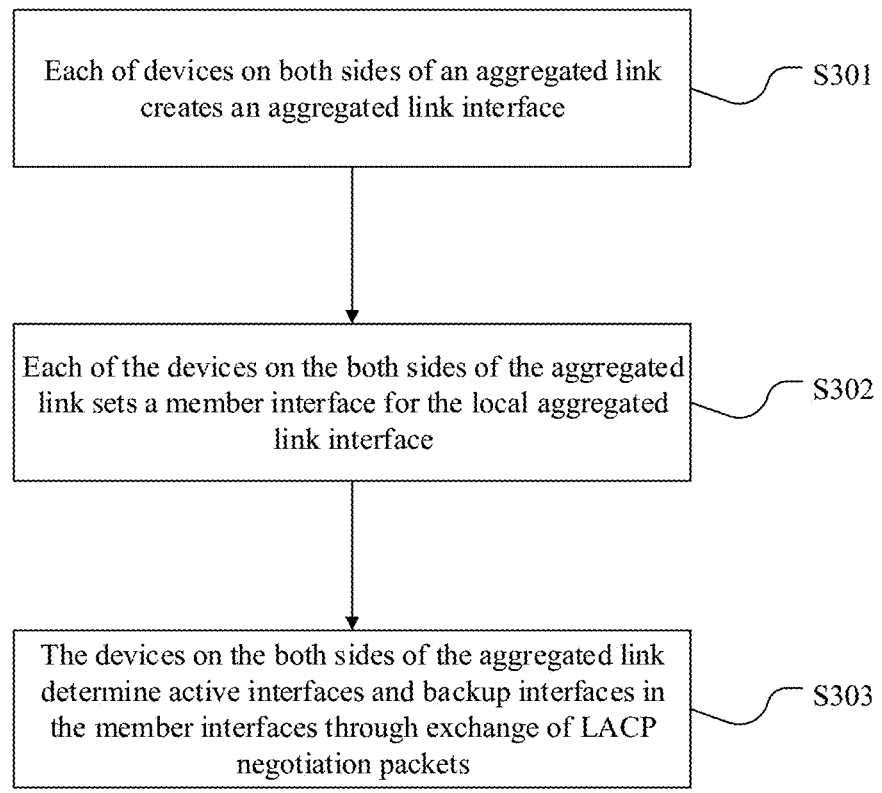
FIG. 3 is a schematic flowchart of establishing an aggregated link in an LACP mode.

The LACP mode may be further classified as a static LACP mode and a dynamic LACP mode. Description is provided below with reference to FIG. 3. FIG. 3 is a schematic flowchart of establishing an aggregated link in an LACP mode. Devices on both sides of the aggregated link enable the LACP protocol in advance.

Step S301: Each of the devices on both sides of the aggregated link creates an aggregated link interface. In a static LACP mode, the aggregated link interfaces need to be created through manual configuration. In a dynamic LACP mode, the aggregated link interfaces are created by the devices on both sides of the aggregated link through exchange of LACP negotiation packets.

Step S302: Each of the devices on both sides of the aggregated link sets a member interface for the local aggregated link interface. After the aggregated link interface is established, if the static LACP mode is used, the member interface needs to be manually added to the aggregated link interface; and if the dynamic LACP mode is used, the devices on both sides of the aggregated link determine the member interfaces through exchange of LACP negotiation packets, and add the member interfaces to the already established aggregation link interfaces.

Step S303: The devices on both sides of the aggregated link determine active interfaces and backup interfaces in the member interfaces through exchange of LACP negotiation packets.

It should be noted herein that all member links of the aggregated link established in the manual mode are used for data transmission. In contrast, in the LACP mode, an M:N backup mode is defined. Member links include an active link and a backup link. Only the active link can participate in data transmission. Specifically, the M:N mode means that the aggregated link established in the LACP mode includes M+N member links, where M member links are active links, and N member links are backup links. The active link is used for data transmission, and the backup link is used to provide a redundancy function. To be specific, when an active link is faulty, one backup link may be selected from the N backup links to take over the active link to participate in data transmission, so that stability of data transmission over the aggregated link is improved. However, regardless of whether the LACP mode is a dynamic mode or a static mode, active links and backup links need to be determined through exchange of LACP negotiation packets after the member interfaces are determined. Specifically, after determining the member interface, each of the devices on both sides of the aggregated link first sends an LACP negotiation packet to a peer device through a local member interface, where the negotiation packet may include a system priority, a MAC address, an interface priority, an interface number, an operation key, and other information of the local device. Then, each of the devices on both sides of the aggregated link compares a system priority, a system ID, and other information of the peer device with those of the local device, to determine an active device from the two devices, to use settings of an active link and a backup link of the active device as settings of an active link and a backup link of the to-be-established aggregated link. After the active interfaces and the backup interfaces are determined, the aggregated link is successfully established in the LACP mode.

It should be noted that the LACP negotiation packet described above is a slow protocol packet (a maximum of five protocol packets are sent per second on average), and may also be referred to as a link aggregation control protocol data unit (LACPDU) packet in some scenarios. Each of the devices on both sides of the link distinguishes an LACP negotiation packet from other packets by using a specific destination MAC address and a protocol type that are carried in the LACP negotiation packet. Specifically, if a destination MAC address in a packet received by a receiving device is a special multicast address 0x01-80-c2-00-00-02, a layer 2 protocol type field is 0x8809, and a protocol subtype field is 0x01, it is determined that the packet is an LACP negotiation packet. Then, the receiving device locally performs, based on the packet, an operation related to the aggregated link, to update a link status of the aggregated link. Specifically, updating the link status may include: on the receiving device side, establishing an aggregation link interface, setting member interfaces for the established aggregation link interface, setting an active interface and a backup interface in the member interfaces, clearing the already established aggregated link interface, or the like.

Figure 1:
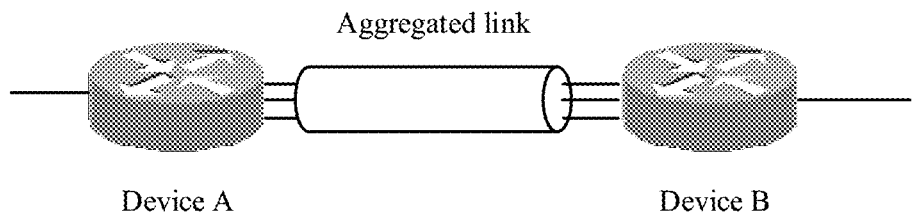
FIG. 1 is a schematic structural diagram of an aggregated link.
Figure 2:
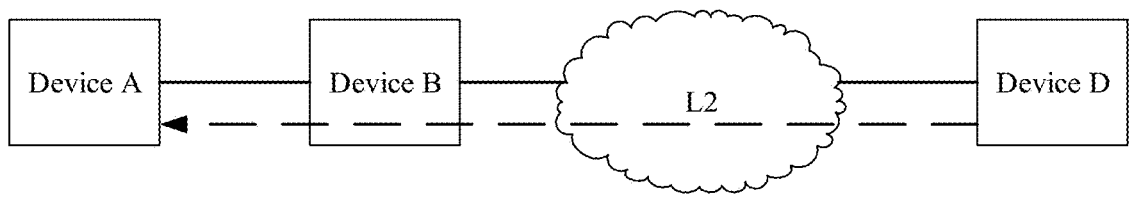
FIG. 2 is a schematic diagram of a transparent transmission scenario.

It can be learned from the foregoing description that, after receiving the packet, the receiving device only determines whether the packet is an LACP negotiation packet; and if the packet is an LACP negotiation packet, updates the link status of the aggregated link based on the LACP packet. With reference to FIG. 2, for example, an aggregated link based on an LACP mode has been established between a device A and a device B or an aggregated link is being established between the device A and the device B through LACP negotiation. Such a state may be defined as a "negotiation established" state. In this case, the device A or the device B receives an LACP negotiation packet sent by a device C. Regardless of whether the device A or the device B updates a link status of the aggregated link between the device A and the device B based on the LACP after receiving the LACP negotiation packet, the status of the aggregated link between the device A and the device B flaps. As a result, establishment of the aggregated link to be established between the device A and the device B fails, or the status of the established aggregated link flaps, affecting data transmission.

Based on the foregoing description, this application provides a packet processing method. The packet processing method can be used in a link aggregation scenario to increase a success rate of establishing an aggregated link and improve stability of data transmission over the aggregated link.

In addition, it should also be noted that as described above, in the scenario of link aggregation based on the LACP mode, the establishment of the aggregated link is hindered or the status of the established aggregated link flaps due to "transparent transmission". If a similar case of "transparent transmission" occurs in another link or in a scenario of link aggregation based on another mode, and such "transparent transmission" has a similar defect, the solution provided in this application can still be used, and an application in the other link or in the scenario of link aggregation based on the other mode still falls within the scope of the solution protected in this application.

Figure 4:
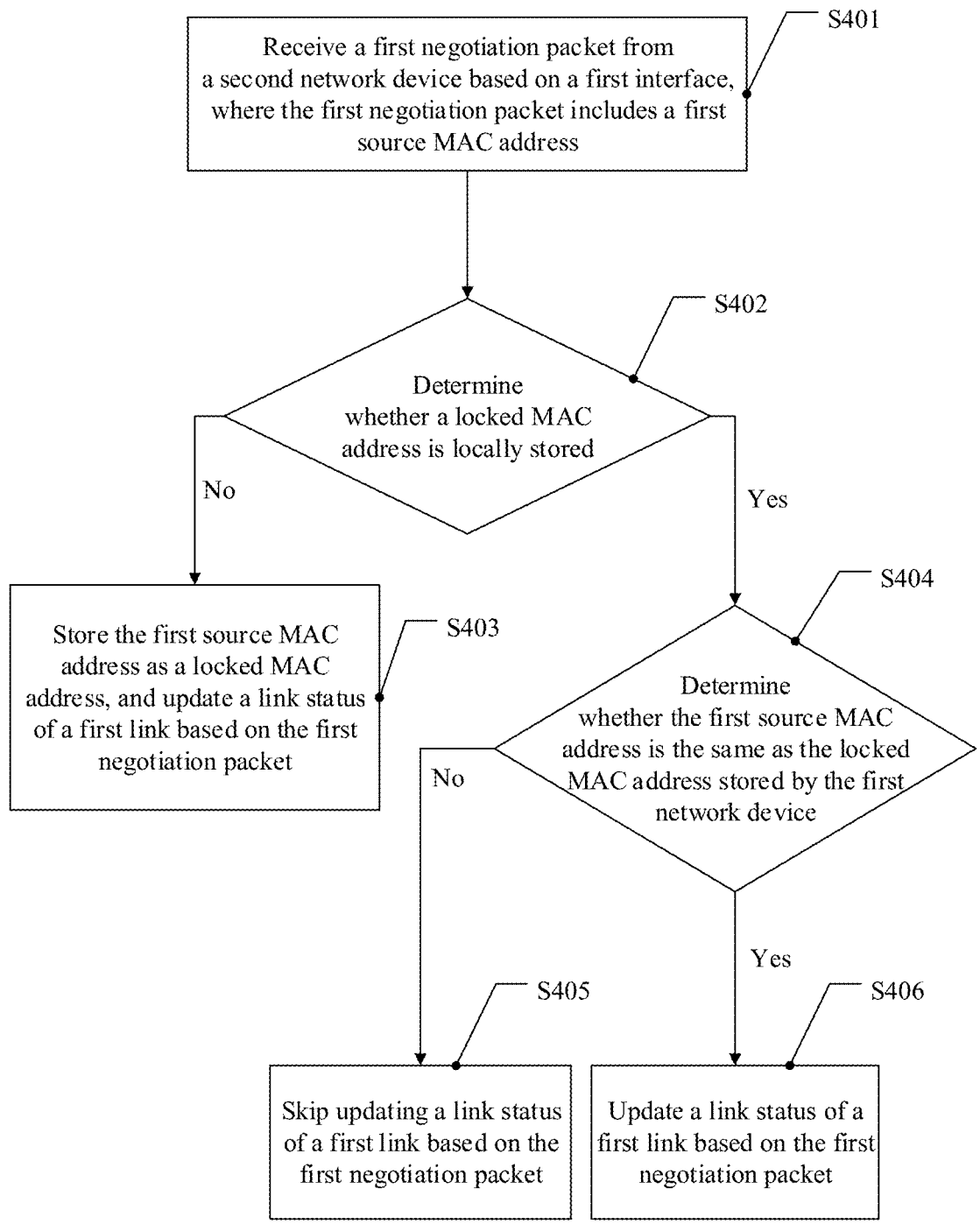
FIG. 4 is a schematic flowchart of a packet processing method according to an embodiment of this application.

The following provides a detailed description with reference to FIG. 4. FIG. 4 is a schematic flowchart of a packet processing method according to an embodiment of this application. The method includes the following steps.

S401: A first network device receives a first negotiation packet from a second network device based on a first interface, where the first negotiation packet includes a first source MAC address, the first source MAC address indicates the second network device, the first negotiation packet is used to update a link status of a first link, and the first link is a link over which the first network device communicates with the second network device based on the first interface.

In a specific embodiment, description is provided by using an example in which the first link is an aggregated link and the first negotiation packet is an LACP negotiation packet.

In a running process, the first network device receives, based on the first interface, a packet sent by the second network device, and obtains, by parsing the packet, a destination MAC address carried in a specific field of the packet and a protocol type corresponding to the packet. If a destination MAC address field in the packet is 0x01-80-c2-00-00-02, a layer 2 protocol type field is 0x8809, and a protocol subtype field is 0x01, it is determined that the packet is an LACP negotiation packet, namely, the first negotiation packet. The first source MAC address carried in the first negotiation packet is a MAC address of the second network device. The first negotiation packet is specifically used to update an interface status of a local interface of the first network device, for example, switch the interface status between an active state, a backup state, an unavailable state, and the like, change a priority of the interface, and add or remove a member interface to/from an aggregation link interface. It should be noted that, the interface whose interface status is to be changed may be the first interface, or may be a member interface, other than the first interface, of the aggregated link on the first network device side other than the first interface when the first interface is a member interface of the aggregated link interface. When the first network device updates the interface status of the local interface of the first network device based on the first negotiation packet, the link status of the first link over which the first network device communicates with the second network device based on the first interface is also updated.

The following two cases are described separately.

(1) Before the first network device receives the first negotiation packet, if the first network device has not established an aggregated link with any other device nor performed LACP negotiation, or the first network device is in the process of establishing an aggregated link through LACP negotiation, the first interface is a physical interface on the first network device side. In this embodiment and subsequent embodiments, a state in which no aggregated link is established with any other device and no LACP negotiation is performed may be defined as an idle state. If the first network device is in an idle state, the first negotiation packet indicates the first network device to establish an aggregated link with the second network device. If the first network device is in the process of establishing an aggregated link with the second network device through LACP negotiation, the first negotiation packet is used to indicate to update the interface status of the local interface of the first network device, to update progress of establishing the aggregated link between the first network device and the second network device through LACP negotiation.

(2) If the first network device has established an aggregated link before receiving the first negotiation packet, the aggregated link is the first link. In this case, the first interface is a logical interface, or referred to as an aggregation link interface, of the first link on the first network device side. The first negotiation packet is used to indicate to update the interface status of the first interface, to update the link status of the first link. For example, member interfaces are set for the first interface, an active interface and a backup interface in the member interfaces are set, or the already established aggregated link interface is cleared, to increase or decrease a quantity of member links in the first link, modify a configuration of active links and backup links in the member links of the aggregated link, disconnect the aggregated link, or the like.

S402: The first network device determines whether the first network device locally stores a locked MAC address, where the locked MAC address is a MAC address of a network device that is determined by the first network device and that has established negotiation with the first network device.

In a specific embodiment, after receiving the first negotiation packet, the first network device determines whether there is a locked MAC address locally. The locked MAC address is a MAC address of a network device that is determined by the first network device and that has established negotiation with the first network device. It should be noted that, in this embodiment and the subsequent embodiments, "locked" in the locked MAC address means: During negotiation, the first network device updates the interface status of the local interface only based on a negotiation packet in which a source MAC address is the locked MAC address. In other words, the first network device skips updating the interface status of the local interface based on a negotiation packet in which a source MAC address is not the locked MAC address. Herein, the network device related to the locked MAC address is another device different from the first network device, the locked MAC address is a MAC address of the other device, and the negotiation establishment includes: The first network device is establishing an aggregated link with the other device through LACP negotiation; or the first network device has established an aggregated link with the other device, and the first network device and the other device may perform data exchange with each other over the aggregated link. In addition, according to the foregoing definition of the idle state, it can be learned that, there is no locked MAC address locally in the idle state.

With reference to FIG. 2, that is, FIG. 2 referenced by this embodiment and the subsequent embodiments, only a location relationship between device A, device B, and the device C that are shown in FIG. 2 is used as an example below for description, and current statuses of links between device A, device B, and device C are not limited. With reference to FIG. 2, if device A is in negotiation with device B at this time, device A and device B each record a locked MAC address. The locked MAC address recorded on device A side is a MAC address of device B, and the locked MAC address recorded on device B side is a MAC address of device A. When device A is in negotiation with device C, this case is similar to the foregoing case. Details are not described herein again.

S403: If the first network device determines that the first network device does not store a locked MAC address, the first network device stores the first source MAC address as a locked MAC address, and the first network device updates the link status of the first link based on the first negotiation packet.

In a specific embodiment, when the first network device determines that the first network device does not store a locked MAC address, that is, the first network device has not established negotiation with another device, the first network device is in an idle state. It can be learned from the content in step S401 that the first network device updates the link status of the first link based on the first negotiation packet, that is, the first network device establishes the first link based on the first negotiation packet. The first link may be an aggregated link. For a specific process of establishing the first link, refer to the description of the steps shown in FIG. 3. It should be noted that, if the process of establishing the first link is performed in a static LACP mode, the first negotiation packet is the first packet used when the devices on both sides of the aggregated link start to establish the aggregated link in step S303; and if the process of establishing the first link is performed in a dynamic LACP mode, the first negotiation packet is the first packet used when the devices on both sides of the aggregated link start to establish the aggregated link in step S301.

When the first network device establishes the first link based on the first negotiation packet, that is, the first network device has established negotiation, the first network device locally stores a MAC address carried in the first negotiation packet, and sets the MAC address as a locked MAC address.

In a specific embodiment, after receiving the first negotiation packet, the first network device starts a timer from a time point at which the first network device receives the first negotiation packet. When the first network device is in the process of establishing the first link based on the first negotiation packet, if the first network device does not receive a second negotiation packet from the second network device based on the first interface within a first period, the first network device clears the recorded locked MAC address after the first period elapses. A second source MAC address carried in the second negotiation packet and the first source MAC address carried in the first negotiation packet are the same MAC address. In an actual scenario, the first period may be preset, for example, set to one minute. To be specific, during establishment of the first link, the first network device clears the recorded locked MAC address if the first network device does not receive, based on the first interface, the second negotiation packet sent by the second network device, within one minute that is after the first network device receives, based on the first interface, the first negotiation packet sent by the second network device.

In some scenarios, when the first network device is in an idle state, the first network device receives the first negotiation packet sent by the second network device, but the second network device becomes faulty after sending the first negotiation packet, and therefore cannot continue to send another negotiation packet or cannot send another negotiation packet in time. In other words, in this case, the second network device is not in a negotiation established state, but the first network device is still in a negotiation established state. It can be learned from the description of the steps in FIG. 3 that, in the process of establishing the aggregated link, the devices on both sides of the link usually need to exchange negotiation packets for a plurality of times to successfully establish the aggregated link. As a result, a large amount of time may be consumed when the first network device waits for the second network device to continue to send a subsequent negotiation packet. Based on this, in this embodiment, when establishing the first link based on the first negotiation packet, the first network device may preset the first period. If the first network device does not receive the second negotiation packet from the second network device within the first period that is after the first network device receives the first negotiation packet, the first network device clears the recorded locked MAC address after the first period elapses. In this way, the first network device avoids consuming a large amount of negotiation time due to the recorded locked MAC address. It should be noted herein that the first link is a link over which the first network device communicates with the second network device based on the first interface, and a negotiation packet that indicates to update establishment progress of the first link based on the first negotiation packet also needs to be transmitted through the first interface. Therefore, the second negotiation packet herein is defined as a negotiation packet that is sent by the second network device and that is received by the first network device based on the first interface.

In a specific embodiment, after receiving the first negotiation packet, the first network device starts a timer from the time point at which the first network device receives the first negotiation packet. When the first network device is in the process of establishing the first link based on the first negotiation packet, if the first network device receives, based on the first interface within the first period, the second negotiation packet sent by the second network device, but the first link fails to enter an UP state through negotiation within a second period, that is, the status of the first link is a DOWN state when the second period elapses, the first network device clears the stored locked MAC address after the second period elapses. A length of the second period is greater than that of the first period, and source MAC addresses in the second negotiation packet and the first negotiation packet are the same MAC address.

In some scenarios, with reference to the scenario shown in FIG. 2, if the first network device is device A, and the second network device is device C, after being connected to device B via a physical link, device A is indirectly connected to device C. When device A is in an idle state, device C may send a first negotiation packet to device A due to a fault or for another reason. Then, device A receives, based on a first interface within a first period, a second negotiation packet sent by device C. After receiving the first negotiation packet, device A starts to establish a first link, that is, an aggregated link, between device A and device C based on the first negotiation packet. After receiving the second negotiation packet, on the basis of the first negotiation packet, the device A updates, based on the second negotiation packet, progress of establishing the first link. However, because device A and device C are not directly connected via a physical link, regardless of any negotiation between device A and device C, the first link cannot enter an UP state through negotiation (the link being in the UP state means that the link is successfully established and data can be transmitted over the link). Consequently, this negotiation process is futile and time-consuming. Based on this, in this embodiment, the first period and the second period are set. For example, the first period and the second period may be set to one minute and three minutes, respectively. If the first network device further receives, based on the first interface, the second negotiation packet sent by the second network device, within one minute that is after the first network device receives the first negotiation packet based on the first interface, but the first network device fails to make the first link enter an UP state through negotiation within three minutes based on the negotiation packets (including the first negotiation packet and the second negotiation packet) that are received from the second network device based on the first interface, when the second period elapses, the first network device clears the recorded locked MAC address, and restarts negotiation with another device. This avoids consumption of time in an unnecessary negotiation process, thereby improving negotiation efficiency.

In a specific embodiment, after the first network device establishes the first link and when the first network device determines that the link status of the first link changes from an UP state to a DOWN state, the first network device starts a timer. If the link status of the first link does not change from the DOWN state back to the UP state within a third period, the first network device clears the recorded locked MAC address when the third period elapses.

In some possible scenarios, for example, the first link has been established between the first network device and the second network device, and the first link is in an UP state through negotiation. However, for some reason, the first link cannot be normally used from a time point, that is, the status of the first link changes from the UP state to a DOWN state (a link interface is disabled, and data cannot be transmitted), affecting data transmission of the first network device. Based on this, in this embodiment, after the first link becomes stable, if the status of the first link changes from an UP state to a DOWN state at a time point, the first network device starts a timer from the time point. If the status of the first link does not change from DOWN back to UP within the third period, when the third period elapses, the first network device disconnects the first link, and clears the stored locked MAC address, so that the first network device can establish a new link with another network device. If the status of the first link changes from DOWN back to UP within the third period, the timer is reset to restore normal data transmission over the first link.

It should be noted that step S402 and step S403 are optional steps.

S404: If the first network device determines that the first network device stores a locked MAC address, the first network device determines whether the first source MAC address is the same as the locked MAC address stored by the first network device.

In a specific embodiment, after performing a parsing operation on the first negotiation packet, the first network device obtains the first source MAC address carried in a field of the first negotiation packet; compares the first source MAC address with the pre-stored locked MAC address to determine whether the first source MAC address is the same as the locked MAC address; and if the first source MAC address is the same as the locked MAC address, determines that the first source MAC address and the locked MAC address are the same address. In other words, whether the first source MAC address is the same as the locked MAC address is determined, to determine whether the second network device is a network device that has established negotiation with the first network device. It should be noted herein that the MAC address herein is used as an identifier for identifying a device. In some possible scenarios, another device identifier may be used herein to achieve a similar effect. For example, a unique corresponding device code may be set for each network device in this solution, and a device code of a sending network device is carried in an idle field of a negotiation packet; and then a receiving network device compares the device code carried in the negotiation packet with a locally stored locked device code, to determine whether the sending network device is a network device that has established negotiation with the receiving network device.

S405: If the first network device determines that the first source MAC address is different from the locked MAC address stored by the first network device, the first network device skips updating the link status of the first link based on the first negotiation packet.

In a specific embodiment, if the first network device determines that the first source MAC address is different from the locked MAC address, that is, determines that the second network device is not a network device that has established negotiation with the first network device, after the first network device parses the first negotiation packet, the first network device does not perform subsequent processing based on the first negotiation packet, that is, skips updating the link status of the first link based on the first negotiation packet.

With reference to a structure in FIG. 2, if the first network device is device A or device B, the second network device is device C, device A has established negotiation with device B, and the first link is a link between device A and device B, locked MAC addresses stored in device A and device B are a MAC address of device B and a MAC address of device A, respectively. In this case, device A or device B receives a first negotiation packet sent by device C. It is clear that device C herein is an incorrect peer end (a network device that has not established negotiation with a local device) for both device A and device B. A first source MAC address carried in the first negotiation packet is not a locally stored locked MAC address. Therefore, after receiving the first negotiation packet, device A or device B skips updating a link status of the first link based on the first negotiation packet. In this way, link status flapping caused by the negotiation packet sent by the incorrect peer end is avoided.

S406: If the first network device determines that the first source MAC address is the same as the locked MAC address stored by the first network device, the first network device updates the link status of the first link based on the first negotiation packet.

In a specific embodiment, if the first network device determines that the first source MAC address is the same as the locked MAC address stored by the first network device, that is, the second network device is a network device that has established negotiation with the first network device or is referred to as a correct peer device, the first network device updates the link status of the first link based on the first negotiation packet. Specifically, updating the link status of the first link means: The first network device updates the status of the first link based on the first negotiation packet by adjusting an interface status of a local interface. For example, member links of the first link and an active link and a backup link in the member links are set by increasing or decreasing a quantity of member interfaces in the first link on the first network device side or adjusting an active interface and a backup interface. Specifically, adjusting the link status of the LACP mode-based aggregated link by using the LACP negotiation packet is currently a common practice in the conventional technology. Details are not described herein.

It can be learned from the foregoing technical solutions that the embodiments of this application have the following advantages:

After receiving, based on the first interface, the first negotiation packet sent by the second network device, the first network device determines whether the first source MAC address included in the first negotiation packet is the same as the locked MAC address stored by the first network device; and if the first source MAC address included in the first negotiation packet is different from the locked MAC address stored by the first network device, the first network device skips updating the link status of the first link based on the first negotiation packet. The first negotiation packet is used to indicate to update the link status of the first link, the first link is a link over which the first network device communicates with the second network device based on the first interface, and the locked MAC address is a MAC address of a network device that is determined by the first network device and that has established negotiation with the first network device. It can be learned from the foregoing description that, whether the first source MAC address is the same as the locked MAC address is determined, to determine whether the second network device is a network device that has established negotiation with the first network device. In addition, when it is determined that the second network device is not a network device that has established negotiation with the first network device, updating the link status of the first link based on the first negotiation packet is not allowed. This avoids a case in which the first link flaps because the first network device updates the link status of the first link based on a negotiation packet sent by an incorrect peer device.

Figure 5:
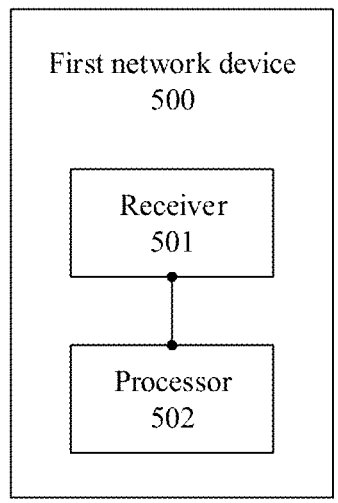
FIG. 5 is a schematic structural diagram of a first network device according to an embodiment of this application.

The following provides a detailed description with reference to FIG. 5. FIG. 5 is a schematic structural diagram of a first network device 500 according to an embodiment of this application. The first network device 500 includes:

a receiver 501, configured to receive a first negotiation packet from a second network device based on a first interface of the first network device, where the first negotiation packet may include a first source media access control MAC address, the first source MAC address indicates the second network device, the first negotiation packet is used to update a link status of the first link, and the first link is a link over which the first network device communicates with the second network device based on the first interface; and a processor 502, configured to: determine whether the first source MAC address is the same as a first locked MAC address stored by the first network device, where the first locked MAC address is a MAC address of a network device that is determined by the first network device and that has established negotiation with the first network device; and when the first network device determines that the first source MAC address is different from the first locked MAC address stored by the first network device, skip updating the link status of the first link based on the first negotiation packet.

In a specific implementation, the receiver 501 is further configured to receive a second negotiation packet from a third network device based on the first interface, where the second negotiation packet may include a second source MAC address, the second source MAC address indicates the third network device, the second negotiation packet is used to update a link status of a second link, and the second link is a link over which the first network device communicates with the third network device based on the first interface; and the processor 502 is further configured to: when it is determined that the first network device does not store a locked MAC address, store the second source MAC address as the first locked MAC address, and update the link status of the second link based on the second negotiation packet.

In a specific implementation, the processor 502 is further configured to: when it is determined that a third negotiation packet from the third network device is not received based on the first interface within a preset first period, clear the first locked MAC address, where a source MAC address in the third negotiation packet is the second source MAC address.

In a specific implementation, the processor 502 is further configured to: when the first network device determines that the first network device receives a fourth negotiation packet from the third network device based on the first interface within a preset second period, and the first network device determines, when the second period elapses, that the link status of the second link is a DOWN state, clear the first locked MAC address, where a source MAC address in the fourth negotiation packet is the second source MAC address, and a length of the second period is greater than that of the first period.

In a specific implementation, the receiver 501 is further configured to receive a fifth negotiation packet from the third network device based on the first interface within a preset first period, where a source MAC address in the fifth negotiation packet is the second source MAC address; and the processor 502 is further configured to determine, based on the second negotiation packet and the fifth negotiation packet, that the link status of the second link is an UP state.

In a specific implementation, the processor 502 is further configured to: start a timer when it is determined that the link status of the second link changes from the UP state to the DOWN state; and if the link status of the second link does not change from the DOWN state back to the UP state within a preset third period, when the third period elapses, clear the recorded first locked MAC address, and disconnect the second link; or if the link status of the second link changes from the DOWN state back to the UP state within a preset third period, end the timer operation.

In a specific implementation, the first negotiation packet is a link aggregation control protocol LACP negotiation packet, the first link is an aggregated link, and the aggregated link may include at least one physical link.

In a specific implementation, the second negotiation packet is an LACP negotiation packet, the second link is an aggregated link, and the aggregated link may include at least one physical link.

As described above, the first network device shown in FIG. 5 may perform corresponding steps that are performed by the first network device in the method of the embodiment shown in FIG. 4. In this way, when the first network device receives a negotiation packet sent by another network device, if the first network device is in a negotiation established state, the first network device determines whether the other network device is a network device that has established negotiation with the first network device. If the other network device is not a network device that has established negotiation with the first network device, the first network device skips updating, based on the negotiation packet, an interface status of an interface on the first network device side in a link carried on the first network device, to avoid link status flapping.

Figure 6:
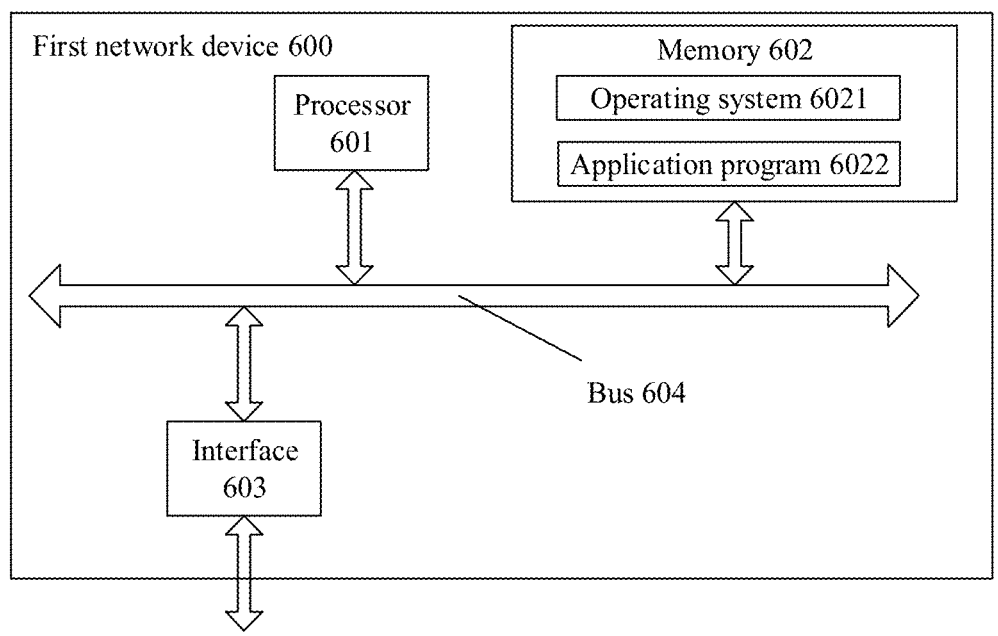
FIG. 6 is a schematic structural diagram of hardware of a first network device according to an embodiment of this application.

FIG. 6 is a schematic structural diagram of hardware of a first network device 600 according to an embodiment of this application. The first network device 600 shown in FIG. 6 may perform corresponding steps that are performed by the first network device in the method of the embodiment shown in FIG. 4.

As shown in FIG. 6, the first network device 600 includes a processor 601, a memory 602, an interface 603, and a bus 604. The interface 603 may be implemented in a wireless or wired manner. Specifically, the interface 603 may be a network interface card. The processor 601, the memory 602, and the interface 603 are connected through the bus 604.

The interface 603 may specifically include a transmitter and a receiver, and is used by the first network device to send information to and receive information from the second network device in the foregoing embodiment. For example, the interface 603 is configured to support receiving a negotiation packet from and sending a negotiation packet to the second network device. For example, the interface 603 is configured to support the process S401 in FIG. 4. The processor 601 is configured to perform processing that is performed by the first network device in the embodiment shown in FIG. 4. For example, the processor 601 is configured to: determine whether the first network device locally stores a locked MAC address; determine whether a first source MAC address and a locked MAC address are the same; update a link status of a link based on a negotiation packet; and/or perform other processes of the technology described in this specification. For example, the processor 601 is configured to support the processes S402 to S406 in FIG. 4. The memory 602 includes an operating system 6021 and an application program 6022, and is configured to store a program, code, or instructions. When the processor or a hardware device executes the program, code, or instructions, a processing process performed by the first network device in the method embodiment can be completed. Optionally, the memory 602 may include a read-only memory (ROM) and a random access memory (RAM). The ROM includes a basic input/output system (BIOS) or an embedded system. The RAM includes an application program and an operating system. When the first network device 600 needs to be run, a booting system bootloader built in the BIOS or the embedded system in the ROM is started to boot the first network device 600 to enter a normal running state. After entering the normal running state, the first network device 600 runs the application program and the operating system in the RAM, to complete the processing process that is performed by the first network device in the method embodiment.

It can be understood that FIG. 6 shows only a simplified design of the first network device 600. In actual application, the first network device may include any quantity of interfaces, any quantity of processors, or any quantity of memories.

Figure 7:
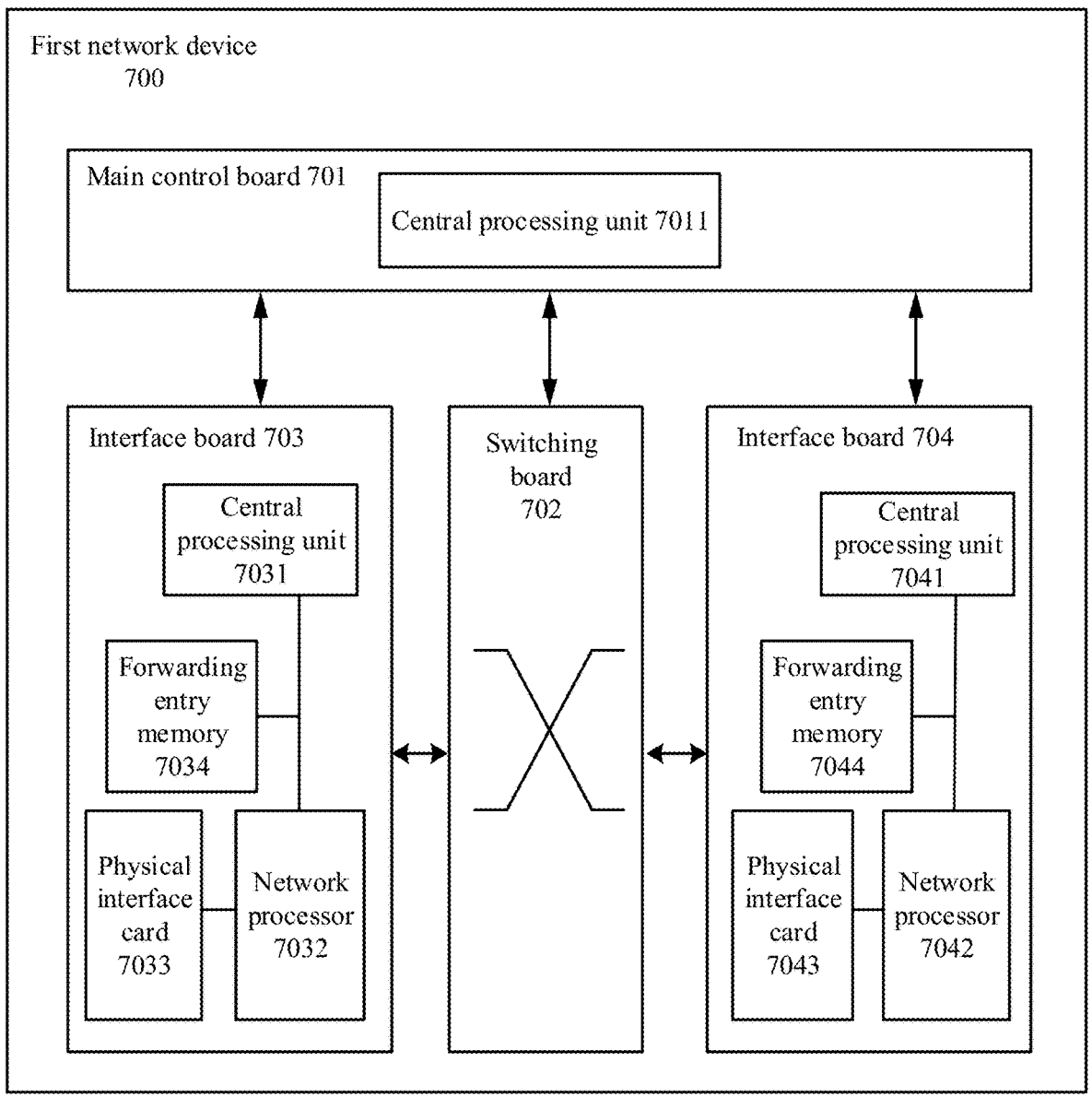
FIG. 7 is a schematic structural diagram of hardware of a first network device according to an embodiment of this application.

FIG. 7 is a schematic structural diagram of hardware of another first network device 700 according to an embodiment of this application. The first network device 700 shown in FIG. 7 may perform corresponding steps that are performed by the first network device in the method of the foregoing embodiment.

As shown in FIG. 7, the first network device 700 includes a main control board 701, an interface board 703, a switching board 702, and an interface board 704. The main control board 701, the interface boards 703 and 704, and the switching board 702 are connected to a system backplane by using a system bus, to implement interworking. The main control board 701 is configured to complete functions such as system management, device maintenance, and protocol processing. The switching board 702 is configured to complete data exchange between the interface boards (the interface board is also referred to as a line card or a service board). The interface boards 703 and 704 are configured to provide various service interfaces such as a POS (Packet Over SONET/SDH) interface, a gigabit Ethernet (GE) interface, and an ATM interface, and implement packet forwarding.

The interface board 703 may include a central processing unit 7031, a forwarding entry memory 7034, a physical interface card 7033, and a network processor 7032. The central processing unit 7031 is configured to control and manage the interface board 703 and communicate with a central processing unit 7011 on the main control board. The forwarding entry memory 7034 is configured to store a forwarding entry. The physical interface card 7033 is configured to receive and send traffic. The network processor 7032 is configured to control, based on the forwarding entry, the physical interface card 7033 to send and receive traffic.

Specifically, the physical interface card 7033 is configured to receive, based on a first interface, a negotiation packet sent by a second network device.

The central processing unit 7011 is configured to determine whether the first network device locally stores a locked MAC address.

The central processing unit 7011 is further configured to: if the first network device does not locally store a locked MAC address, or if the first network device stores a locked MAC address and the locked MAC address is the same as a source MAC address carried in the negotiation packet, update a link status of a first link based on the negotiation packet, where the first link is a link over which the first network device communicates with the second network device based on the first interface.

The central processing unit 7011 is further configured to: if it is determined that the first network device locally stores a locked MAC address but the locked MAC address is different from a source MAC address carried in the negotiation packet, skip updating a link status of a first link based on the negotiation packet, where the first link is a link over which the first network device communicates with the second network device based on the first interface.

After receiving the negotiation packet, the physical interface card 7033 sends the negotiation packet to the central processing unit 7011 via the central processing unit 7031, and the central processing unit 7011 processes the negotiation packet.

The central processing unit 7031 is further configured to control the network processor 7032 to obtain the forwarding entry in the forwarding entry memory 7034, and the central processing unit 7031 is further configured to control the network processor 7032 to receive and send traffic via the physical interface card 7033.

It should be understood that, in this embodiment of the present application, operations performed on the interface board 704 are the same as those performed on the interface board 703. For brevity, details are not described again. It should be understood that the first network device 700 in this embodiment may correspond to the functions and/or various steps implemented in the foregoing method embodiment, and details are not described herein again.

In addition, it should be noted that there may be one or more main control boards. When there are a plurality of main control boards, the main control boards may include a primary main control board and a secondary main control board. There may be one or more interface boards. A higher data processing capability of the first network device requires provision of more interface boards. In addition, there may be one or more physical interface cards on the interface board. There may be no switching board, or there may be one or more switching boards. If there are a plurality of switching boards, the switching boards may jointly implement load sharing and redundancy backup. In a centralized forwarding architecture, the first network device may not need a switching board, and the interface board is responsible for a function of processing service data of an entire system. In a distributed forwarding architecture, the first network device may include at least one switching board, implement data exchange between a plurality of interface boards by using the switching board, and provide large-capacity data exchange and processing capabilities. Therefore, data access and processing capabilities of the first network device in the distributed architecture are higher than those of the first network device with the centralized architecture. Which architecture is to be specifically used depends on a specific networking deployment scenario. This is not limited herein.

An embodiment of this application further provides a computer storage medium. The medium stores instructions, and when the instructions are run on a computer, the computer is enabled to perform the method in any one of the implementations in the embodiment shown in FIG. 4.

An embodiment of this application further provides a computer program product. The computer program product may include instructions, and when the instructions are run on a computer, the computer is enabled to perform the method in any one of the implementations in the embodiment shown in FIG. 4.

An embodiment of this application further provides a chip system. The chip system includes a processor, configured to support a first network device in implementing the method in any one of the implementations in the embodiment shown in FIG. 4, for example, sending or processing data and/or information used in the foregoing method. In a possible design, the chip system further includes a memory, and the memory is configured to store program instructions and data that are necessary for the first network device. The chip system may include a chip, or may include a chip and another discrete device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A packet processing method, comprising:
receiving, by a first network device, a first negotiation packet from a second network device based on a first interface of the first network device, wherein the first negotiation packet comprises a first source media access control (MAC) address, the first source MAC address indicates the second network device, the first negotiation packet is used to update a link status of a first link, the first network device communicates with the second network device over the first link based on the first interface;
determining, by the first network device, whether the first source MAC address is the same as a first locked MAC address stored by the first network device, wherein the first locked MAC address is of a network device that is determined by the first network device and that has established negotiation with the first network device;
when the first network device determines that the first source MAC address is different from the first locked MAC address stored by the first network device, skipping, by the first network device, updating the link status of the first link based on the first negotiation packet;
receiving, by the first network device, a second negotiation packet from a third network device based on the first interface, wherein the second negotiation packet comprises a second source MAC address that indicates the third network device, the second negotiation packet is used to update a link status of a second link, and the first network device communicates with the third network device over the second link based on the first interface; and
when the first network device determines that the first network device does not store a locked MAC address, storing, by the first network device, the second source MAC address as the first locked MAC address, and updating, by the first network device, the link status of the second link based on the second negotiation packet.

2. The method according to claim 1, wherein after storing, by the first network device, the second source MAC address as the first locked MAC address, the method further comprises:
when the first network device determines that the first network device does not receive a third negotiation packet from the third network device based on the first interface within a preset first period, clearing, by the first network device, the first locked MAC address, wherein a source MAC address in the third negotiation packet is the second source MAC address.

3. The method according to claim 2, wherein after storing, by the first network device, the second source MAC address as the first locked MAC address, the method further comprises:
when the first network device determines that the first network device receives a fourth negotiation packet from the third network device based on the first interface within a preset second period, and the first network device determines, when the second period elapses, that the link status of the second link is a DOWN state, clearing, by the first network device, the first locked MAC address, wherein a source MAC address in the fourth negotiation packet is the second source MAC address, and a length of the second period is greater than that of the first period.

4. The method according to claim 1, wherein after storing, by the first network device, the second source MAC address as the first locked MAC address, the method further comprises:
determining, by the first network device, that the first network device receives a fifth negotiation packet from the third network device based on the first interface within a preset first period, wherein a source MAC address in the fifth negotiation packet is the second source MAC address; and
determining, by the first network device based on the second negotiation packet and the fifth negotiation packet, that the link status of the second link is an UP state.

5. The method according to claim 4, wherein after determining, by the first network device based on the second negotiation packet and the fifth negotiation packet, that the link status of the second link is an UP state, the method further comprises:
starting, by the first network device, a timer when the first network device determines that the link status of the second link changes from the UP state to the DOWN state; and
if the link status of the second link does not change from the DOWN state back to the UP state within a preset third period, when the third period elapses, clearing, by the first network device, the recorded first locked MAC address, and disconnecting the second link; or
if the link status of the second link changes from the DOWN state back to the UP state within the preset third period, ending, by the first network device, the timer operation.

6. The method according to claim 1, wherein the first negotiation packet is a link aggregation control protocol (LACP) negotiation packet, and the first link is an aggregated link comprising at least one physical link.

7. The method according to claim 1, wherein the second negotiation packet is an LACP negotiation packet, and the second link is an aggregated link comprising at least one physical link.

8. A first network device for packet processing, comprising:
a non-transitory memory storing instructions; and
a processor coupled to the non-transitory memory; wherein the instructions, when executed by the processor, cause the first network device to be configured to:
receive a first negotiation packet from a second network device based on a first interface of the first network device, wherein the first negotiation packet comprises a first source media access control (MAC) address, the first source MAC address indicates the second network device, the first negotiation packet is used to update a link status of a first link, and the first network device communicates with the second network device over the first link based on the first interface; and determine whether the first source MAC address is the same as a first locked MAC address stored by the first network device, wherein the first locked MAC address is of a network device that is determined by the first network device and that has established negotiation with the first network device;

when the first network device determines that the first source MAC address is different from the first locked MAC address stored by the first network device, skip updating the link status of the first link based on the first negotiation packet;

receiving, by the first network device, a second negotiation packet from a third network device based on the first interface, wherein the second negotiation packet comprises a second source MAC address that indicates the third network device, the second negotiation packet is used to update a link status of a second link, and the first network device communicates with the third network device over the second link based on the first interface; and when the first network device determines that the first network device does not store a locked MAC address, storing, by the first network device, the second source MAC address as the first locked MAC address, and updating, by the first network device, the link status of the second link based on the second negotiation packet.

9. The first network device according to claim 8, wherein the instructions, when executed by the processor, further cause the first network device to be configured to when it is determined that a third negotiation packet from the third network device is not received based on the first interface within a preset first period, clear the first locked MAC address, wherein a source MAC address in the third negotiation packet is the second source MAC address.

10. The first network device according to claim 9, wherein the instructions, when executed by the processor, further cause the first network device to be configured to when the first network device determines that the first network device receives a fourth negotiation packet from the third network device based on the first interface within a preset second period, and the first network device determines, when the second period elapses, that the link status of the second link is a DOWN state, clear the first locked MAC address, wherein a source MAC address in the fourth negotiation packet is the second source MAC address, and a length of the second period is greater than that of the first period.

11. The first network device according to claim 8, wherein the instructions, when executed by the processor, further cause the first network device to be configured to receive a fifth negotiation packet from the third network device based on the first interface within a preset first period, wherein a source MAC address in the fifth negotiation packet is the second source MAC address; and determine, based on the second negotiation packet and the fifth negotiation packet, that the link status of the second link is an UP state.

12. The first network device according to claim 11, wherein the instructions, when executed by the processor, further cause the first network device to be configured to start a timer when it is determined that the link status of the second link changes from the UP state to the DOWN state; and if the link status of the second link does not change from the DOWN state back to the UP state within a preset third period, when the third period elapses, clear the recorded first locked MAC address, and disconnect the second link; or if the link status of the second link changes from the DOWN state back to the UP state within the preset third period, end the timer operation.

13. The first network device according to claim 8, wherein the first negotiation packet is a link aggregation control protocol (LACP) negotiation packet, and the first link is an aggregated link comprising at least one physical link.

14. The first network device according to claim 8, wherein the second negotiation packet is an LACP negotiation packet, the second link is an aggregated link comprising at least one physical link.

15. A non-transitory computer storage medium, wherein the medium stores instructions; and when the instructions are run on a computer, the computer is enabled to perform:

receiving, by a first network device, a first negotiation packet from a second network device based on a first interface of the first network device, wherein the first negotiation packet comprises a first source media access control (MAC) address, the first source MAC address indicates the second network device, the first negotiation packet is used to update a link status of a first link, and the first network device communicates with the second network device over the first link based on the first interface;

determining, by the first network device, whether the first source MAC address is the same as a first locked MAC address stored by the first network device, wherein the first locked MAC address is a MAC address of a network device that is determined by the first network device and that has established negotiation with the first network device;

when the first network device determines that the first source MAC address is different from the first locked MAC address stored by the first network device, skipping, by the first network device, updating the link status of the first link based on the first negotiation packet;

receiving, by the first network device, a second negotiation packet from a third network device based on the first interface, wherein the second negotiation packet comprises a second source MAC address that indicates the third network device, the second negotiation packet is used to update a link status of a second link, and the first network device communicates with the third network device over the second link based on the first interface; and when the first network device determines that the first network device does not store a locked MAC address, storing, by the first network device, the second source MAC address as the first locked MAC address, and updating, by the first network device, the link status of the second link based on the second negotiation packet.

16. The non-transitory computer storage medium according to claim 15, wherein after storing, by the first network device, the second source MAC address as the first locked MAC address, the method further comprises:

when the first network device determines that the first network device does not receive a third negotiation packet from the third network device based on the first interface within a preset first period, clearing, by the first network device, the first locked MAC address, wherein a source MAC address in the third negotiation packet is the second source MAC address.

17. The non-transitory computer storage medium according to claim 16, wherein after storing, by the first network device, the second source MAC address as the first locked MAC address, the method further comprises:

when the first network device determines that the first network device receives a fourth negotiation packet from the third network device based on the first interface within a preset second period, and the first network device determines, when the second period elapses, that the link status of the second link is a DOWN state, clearing, by the first network device, the first locked MAC address, wherein a source MAC address in the fourth negotiation packet is the second source MAC address, and a length of the second period is greater than that of the first period.

18. The non-transitory computer storage medium according to claim 15, wherein after storing, by the first network device, the second source MAC address as the first locked MAC address, the method further comprises:

determining, by the first network device, that the first network device receives a fifth negotiation packet from the third network device based on the first interface within a preset first period, wherein a source MAC address in the fifth negotiation packet is the second source MAC address; and determining, by the first network device based on the second negotiation packet and the fifth negotiation packet, that the link status of the second link is an UP state.

19. The non-transitory computer storage medium according to claim 18, wherein after determining, by the first network device based on the second negotiation packet and the fifth negotiation packet, that the link status of the second link is an UP state, the method further comprises:

starting, by the first network device, a timer when the first network device determines that the link status of the second link changes from the UP state to the DOWN state; and if the link status of the second link does not change from the DOWN state back to the UP state within a preset third period, when the third period elapses, clearing, by the first network device, the recorded first locked MAC address, and disconnecting the second link; or if the link status of the second link changes from the DOWN state back to the UP state within the preset third period, ending, by the first network device, the timer operation.

20. The non-transitory computer storage medium according to claim 15, wherein the first negotiation packet is a link aggregation control protocol (LACP) negotiation packet, and the first link is an aggregated link comprising at least one physical link.

* * * * *